May 6, 1941.   L. E. LOVE   2,240,994
ROTARY SUBSOILER
Filed April 5, 1940

L. E. Love  INVENTOR.

BY

ATTORNEYS.

Patented May 6, 1941

2,240,994

UNITED STATES PATENT OFFICE 2,240,994

ROTARY SUBSOILER

Leslie E. Love, Albuquerque, N. Mex.; dedicated to the free use of the People in the territory of the United States Application April 5, 1940, Serial No. 328,056

5 Claims. (Cl. 97—209)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention relates to a device for cutting a furrow or chisel mark in soil.

One of the objects of this invention is the provision of such a device which will make a furrow or opening in the soil without materially disturbing the vegetation or top soil.

Another object of this invention is the provision of a device which will cut an opening through top soil, so that water will penetrate the subsoil or the lower layers of the top soil and provide moisture to roots of vegetation.

A further object of this invention is the provision of a device of the type mentioned which can be operated at fast speeds and thereby reduce the time and cost of so treating land.

The following description considered together with the accompanying drawing will fully disclose this invention, its construction, arrangements, and combinations of parts, and further objects and advantages thereof will be apparent.

Figure 1:
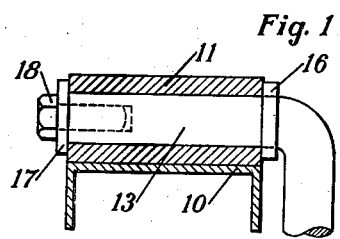
Figure 1 is a front elevational view, partly in section of an embodiment of this invention.
Figure 2:
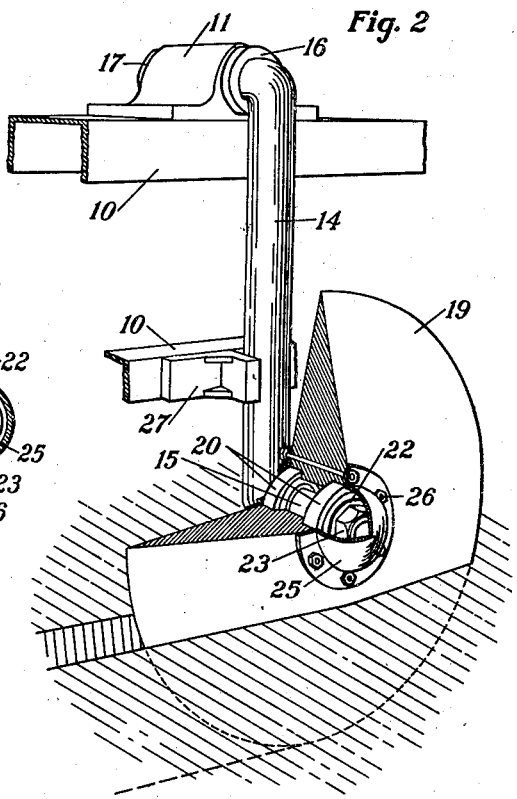
Figure 2 is an isometric view with a portion of the disc cut away.

Referring with more particularity to Figures 1 and 2 in which like numerals designate like parts, the numeral 10 designates a fragment of a tractor frame, or the frame of some other suitable vehicle, to which is attached a bearing 11. A crank 12, having a crank shaft 13, a crank arm 14 and a shouldered spindle 15, is disposed on the vehicle frame with the crank arm 13 rotatably mounted in the bearing 11 and held therein by means of thrust washers 16 and 17 and the cap screws 18. The thrust washer 16 is welded or otherwise secured to the crank shaft 13.

A solid cutting wheel 19 is mounted on the spindle 15 with anti-friction bearings, such as ball bearings 20, between the shoulder 21 of the spindle 15 and the thrust washer 22, and is held in position by means of a nut 23 secured on the end of the spindle 15 against the washer 22. Dust caps 24 and 25 are secured on the sides of the cutting wheel 19 to protect the inner bearings from dust or other foreign materials. These dust caps are held in place by means of bolt and nut assemblies 26 through the wheel 19.

At a point beneath the outer end of the bearing 11, an abutment or stop 27 is secured to the vehicle frame 10, substantially as shown, on the aft side of the crank arm 14.

Figure 3:
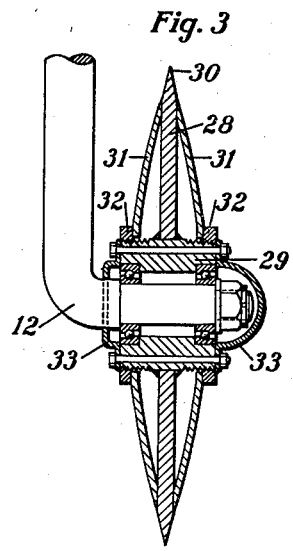
Figure 3 is a fragmentary elevational view, partly in section, showing a modified embodiment of this invention.

The modified form, shown in Figure 3 is for the purpose of varying the size of the cut. In this modified form, the solid wheel 19, shown in Figures 1 and 2, is replaced by a thin disc 28 secured midway between the ends of the threaded hub 29. The periphery of the disc 28 is formed to the shape of a sharp cutting edge 30. Against the sides of the disc 28, a pair of outwardly curved discs 31, 31, of any selected size, are removably secured by means of a pair of nuts 32, 32 secured over the ends of the hub 29, and held in position by the edges of the dust caps 33, 33 projecting a short way beyond the hub 29. The hub 29 is mounted on the spindle of the crank 12 in the same manner as the first form of the invention above described.

Figure 4:
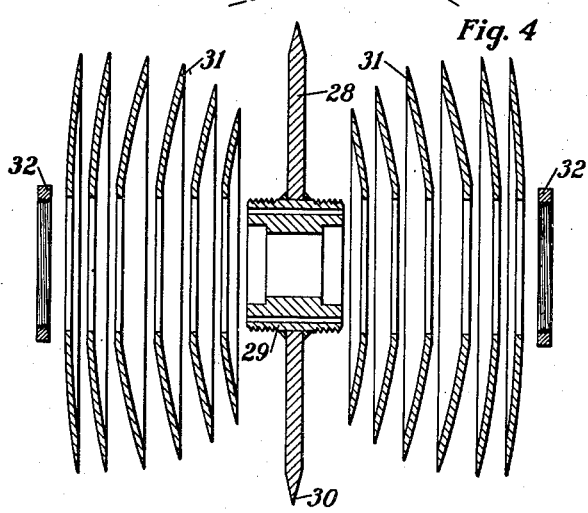
Figure 4 is an exploded section view showing the central disc, hub and various sizes and shapes of the outer curved disc which may be used substitutively in the modified form illustrated in Figure 3.

The operation of this invention is as follows: As the tractor moves forward, the crank 12 is lowered and the movement of the tractor causes the wheel 19 (Figures 1 and 2), or the comparable assembly in Figure 4, to bear into the ground and backward toward the rear of the tractor until the crank arm 14 strikes the abutment member 27. When the crank arm 14 strikes the abutment 27, further rotational movement thereof is arrested, and the continued movement of the tractor causes the wheel 19 to rotate and to carve a narrow deep furrow. The rotation of the wheel 19 obviates a material disturbance of the ground and vegetation. The device simply cuts a furrow or chisel mark in the ground by pressing the dirt to each side. By using discs of different shapes and sizes as described in the modified form, cuts of different depths and widths can be made. This variable treatment is often found necessary on lands of different slopes requiring different treatments.

By using this device, more economical results can be obtained, because it is possible to make the furrows closer together than other known devices. This results in a more even penetration over the entire treated area.

This device is particularly beneficial to land having a sloping range, or to pasture land where run-off from rainfall is so rapid that the water does not have a chance to penetrate the soil. Also, by treating idle and range land that is sloping with this device, a vegetative cover will be brought back, which will in turn prevent the soil from being carried away by wind or water and, consequently, will prevent wind and water erosion.

In flat irrigated, or non-irrigated land, planted to alfalfa, or other perennial crops, the top soil often becomes packed and hard so that water cannot penetrate to a depth that will cause vegetation to grow. However, when such land is treated with this device, water and oxygen can go down to the roots and revive vegetational growth.

Having thus described my invention, I claim:

1. In combination with a tractor or other suitable vehicle a crank having a crank arm, a crank shaft at one end of said arm and a shouldered spindle at the other end, said crank shaft being rotatably mounted on the frame of said vehicle, an abutment secured to said vehicle beneath the mounting of said shaft in the path of revolution of said crank arm, and a removable cutting wheel rotatably mounted on said spindle.

2. In a furrowing device, a cutting wheel comprising a hub adapted to be rotatably mounted on a shaft, a cutting disc secured about said hub between its ends, and a pair of outwardly curved discs secured to the sides of said cutting disc.

3. In a furrowing device, a cutting wheel comprising a hub adapted to be rotatably mounted on a shaft, a cutting disc secured about said hub between its ends, and a pair of outwardly curved discs removably secured to the sides of said cutting disc.

4. An article of manufacture comprising a threaded hub member, a sharp-edged disc secured to said hub between its ends, a pair of outwardly curved discs adjacent the sides of said sharp-edged disc, and nuts engaging said threaded hubs to abut said curved discs and to hold them in place.

5. In combination with the frame of a vehicle, a crank having a crank arm, a crank shaft at one end of said arm and a spindle at the other end, said crank shaft being rotatably mounted on the frame of said vehicle, an abutment secured to said frame beneath the mounting of said shaft in the path of revolution of said crank arm, and a cutting wheel rotatably mounted on said spindle.

L. E. LOVE.